(No Model.)
P. SCHMIDT.
GALVANIC ELEMENT.
No. 583,128. Patented May 25, 1897.
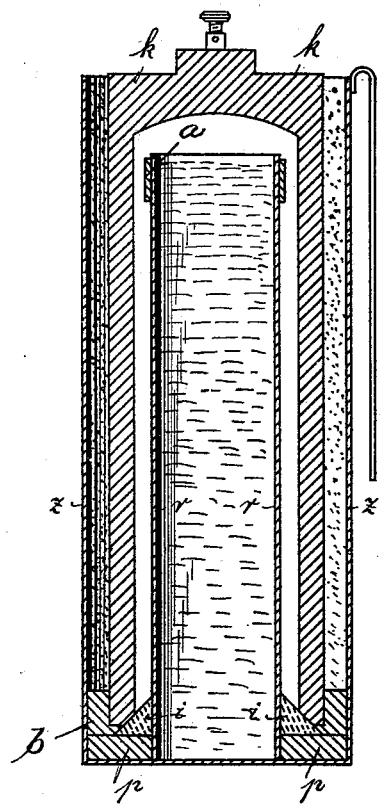

United States Patent Office.

PAUL SCHMIDT, OF BERLIN, GERMANY.

GALVANIC ELEMENT.

SPECIFICATION forming part of Letters Patent No. 583,128, dated May 25, 1897.

Application filed May 29, 1896. Serial No. 593,624. (No model.)

*To all whom it may concern:*

Be it known that I, PAUL SCHMIDT, a subject of the Duke of Anhalt, residing at Berlin, Kingdom of Prussia, German Empire, have invented certain new and useful Improvements in Galvanic Elements, of which the following is a specification.

The present invention relates to galvanic batteries designed to remedy the present defects in dry batteries, and has the advantage of being easy to transport and resisting, effective, constant, and lasting.

The characteristic feature of the invention is the placing of a carbon cylinder in the annular space between the two zinc cylinders, while the inside of the carbon contains a generating fluid, and the annular space between the carbon and the outside zinc cylinder is filled with a generating-paste.

The battery is illustrated by a section view in the accompanying drawing.

The zinc cylinder $z$ is provided with an inside tube $r$, also of zinc and electrically connected. In the annular space formed thereby, the bottom of which is covered with a layer of paraffin $p$, a carbon cylinder $k$ is placed, resting below on a conical ring $i$, of insulating material, such as hard rubber. On top the contact between the tube $r$ and the carbon cylinder is prevented by a rubber ring $a$. Before inserting the cylinder $k$ the tube $r$ is first filled with a sal-ammoniac solution, and later the annular chamber between $k$ and $z$ is filled with a paste after the bottom has been provided with a layer of paraffin $b$. By reversing the battery and placing the same upright again the sal-ammoniac solution will be conveyed out of the tube $r$ into the annular space between $r$ and $k$, and the battery will in such a manner be renovated as the liquid sinks in the annular space and will keep the paste moist on account of the porosity of the carbon.

I claim—

1. A galvanic battery consisting of the annular chamber, a carbon cylinder therein between two zinc cylinders $z$ and $r$ the intermediate space between the outside zinc cylinder and the carbon cylinder being filled with a current-generating paste and the space between the carbon and the inner zinc cylinder being filled with a generating liquid the latter of which is poured in the inner zinc before the putting together of the battery and is conveyed into the said space as required by reversing the battery, substantially as described.

2. A galvanic battery comprising an inner cylinder closed at its lower end and forming one electrode, the electrode-cylinder $k$ closed at its top and fitting over the inner cylinder so as to leave the upper end thereof open and a space between the cylinders, the said cylinder $k$ being seated at its lower edge about the inner cylinder, the cylinder $i$ about the electrode $k$, said galvanic battery being adapted to be inverted and containing an electrolyte within the cylinders, substantially as described.

In witness whereof I have hereunto set my hand in presence of two witnesses.

PAUL SCHMIDT.

Witnesses:
   MAURICE J. HAHLO,
   E. KELLER.